Oct. 20, 1936.                M. A. PATARSINI                2,058,387
                            EDGE GAUGE MECHANISM
                            Filed Aug. 1, 1935          2 Sheets-Sheet 1
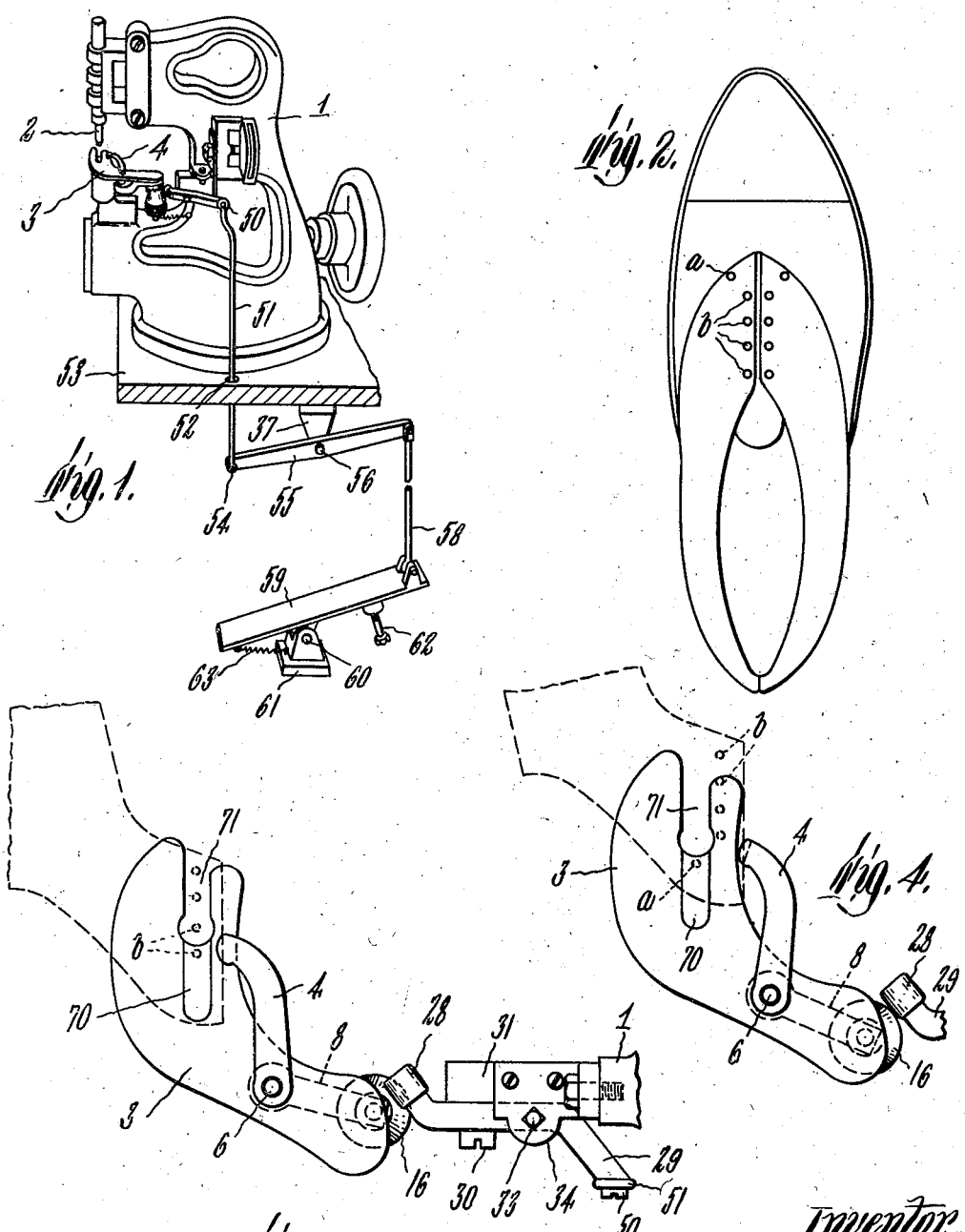

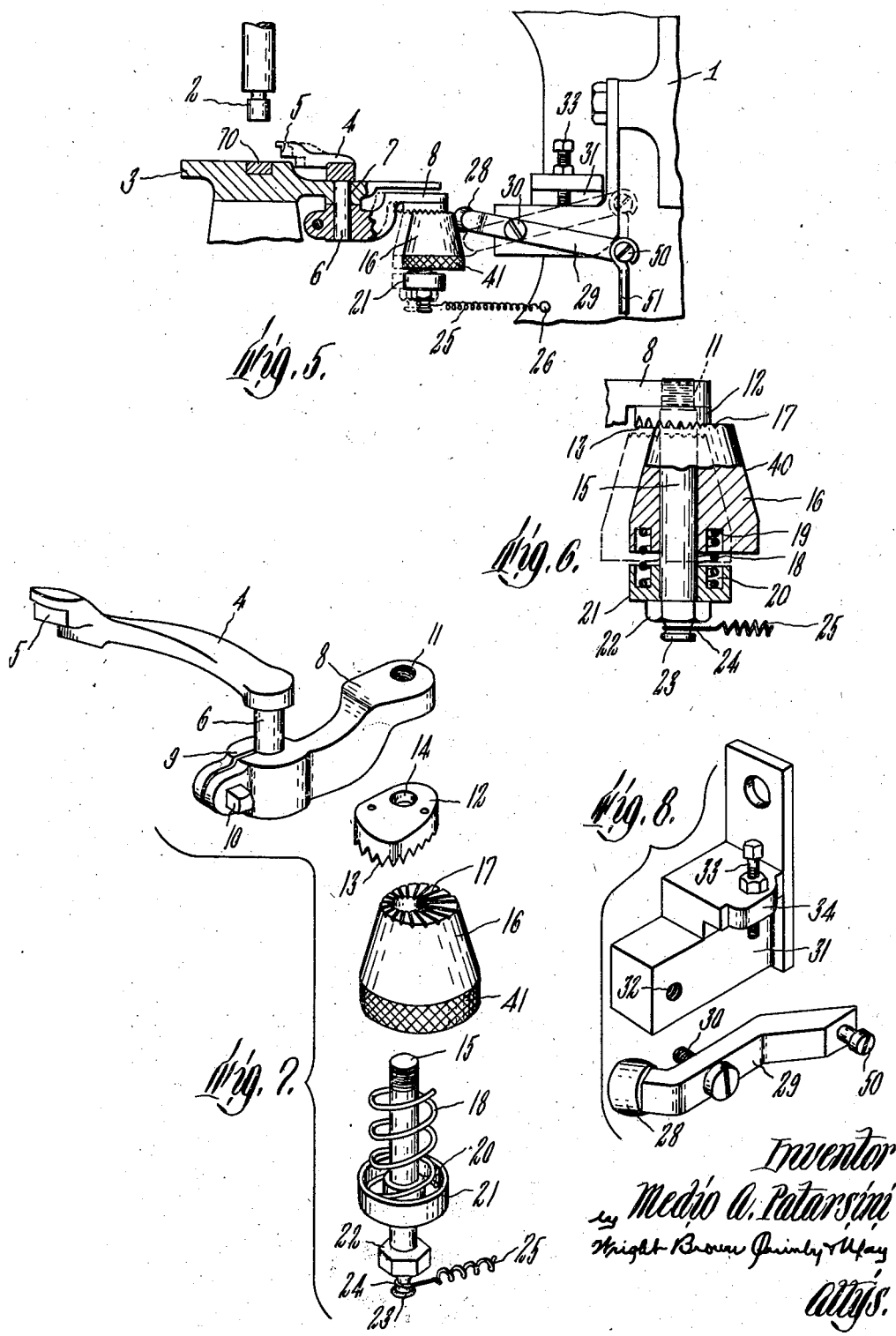

Patented Oct. 20, 1936

2,058,387

UNITED STATES PATENT OFFICE 2,058,387

EDGE GAUGE MECHANISM

Medio A. Patarsini, Wareham, Mass., assignor to Atlas Tack Corporation, Fairhaven, Mass., a corporation of New York Application August 1, 1935, Serial No. 34,171

7 Claims. (Cl. 218—17.2)

This invention relates to edge gauge mechanism and has for an object to provide a gauge which can be adjusted quickly from one to another definite positions so that this may be done during the operation of the machine on which the gauge is used. It may, for example, be used to gauge the distance in from the edge of the work that individual elements, such as eyelets, may be set, whereby at will these elements may be set at either selected of two distances from the edge.

It is now common practice, for example, to set the forward eyelet on each side of a lace oxford upper further from the adjacent edge of the quarter than the other eyelet. In accordance with this invention, therefore, means may be provided under control of the operator whereby the edge gauge which determines this spacing from the edge of the work, may be changed between its normal position for the rear eyelets and another position suitable for the forward eyelets.

For a more complete understanding of this invention reference may be had to the accompanying drawings, in which Figure 1 is an outline perspective view of an eyeletting machine of a well known type and illustrating the invention.

Figure 2 is a somewhat diagrammatic top plan view of an oxford shoe showing an eyelet arrangement which may be produced by mechanism of this invention.

Figures 3 and 4 are fragmentary top plan views of the work table and gauge showing the two gauge positions.

Figure 5 is a fragmentary side elevation partly broken away and in section through the work table.

Figure 6 is a detail partly in section, showing the gauge adjusting mechanism.

Figure 7 is an exploded perspective showing the gauge and the parts shown in Figure 6.

Figure 8 is a similar view of certain of the gauge-moving parts.

Referring to the drawings, in Figure 1 is shown at 1 an eyeletting machine of the well known Peerless type having eyelet punching and setting mechanism indicated generally at 2, and a work table at 3 for supporting work to be presented to the mechanism 2 which sets eyelets step by step therein at a distance from the edge of the work determined by the setting of an edge gauge shown at 4.

Referring now to Figures 3 and 4, which show the edge gauge and work table to a larger scale, and to Figure 7 which shows the edge gauge separately, it will be noted that this gauge has a work engaging face 5 at one end, the gauge being in the form of a lever having a pivot portion 6 which extends through and is journaled in a suitable opening 7 in the table 3, as shown in Figure 5. To the lower end of the pivot 6 is shown attached an arm 8. This arm may have a split bearing portion 9 which may be clamped to the part 6 as by means of the clamp screw 10. The parts so far described are the standard parts of an eyeletting machine of the type illustrated.

In accordance with this invention, the arm 8 has attached thereto a locking plate 12, which is shown best in Figures 5, 6 and 7, provided with a serrated lower face, as at 13. This locking plate 12 is provided with a perforation 14 through which may be extended a pivot pin 15, (see Figure 6) the upper end of which is screwed into a threaded opening 11 in the end of the arm 8. On this pivot 15 is shown journaled for axial movement a cam sleeve 16, which has on its upper face, as at 17, serrations which may mate the serrations of the locking plate 12 so that the sleeve 16 may be held in any of the plurality of angular positions about the pivot 15. The sleeve 16 is normally urged into locking relation to the locking plate 12 as by a coil spring 18. This spring is shown as seated at one end in an annular groove 19 in the lower face of the sleeve 16 concentrically arranged with respect to the pivot 15, and its other end in a similar annular recess 20 in an abutment member 21 which is normally supported on a nut 22 threaded on the lower end of the pivot 15. This nut 22 is shown as provided with a headed extension 23 about which, above the head, may be engaged a loop 24 on a coil spring 25, the opposite end of which is secured to a suitable part of the machine frame, as at 26, (see Figure 5). This spring, acting on the arm 8, holds the face of the cam sleeve 16 against a cam follower roll 28 journaled at the outer end of a lever 29. As shown best in Figures 5 and 8, this lever 29 is fulcrumed as on the screw 30 to a bracket 31 secured to a suitable portion of the machine frame, this screw being threaded into an opening 32 in the bracket 31. Above the lever 29 a stop screw 33 is threaded through a lateral extension 34 on the bracket to furnish a stop limiting the upward movement of the right hand end portion of the lever 29 by its impingement thereagainst, as shown by the dotted lines in Figure 5. The cam sleeve 16 is shown as having a tapered cam face portion 40 for engagement with the cam follower roll 28 so that as the lever 29 is rocked to bring the cam follower 28 downwardly the arm 8 is rocked in position to swing the gauge face 5 away from the eyeletting mechanism so as to permit the setting of eyelets further away from the edge of the work. The initial position of this gauge is determined by the angular position of the sleeve 16 on its pivot 15, and this can be adjusted by grasping the knurled margin 41 of the sleeve, pressing the sleeve away from the locking plate 12 against the action of the spring 18 and then turning the sleeve 16 to the desired angular position, whereupon it may again move into locking relation to the plate 12 in its new position of adjustment by merely releasing the downward pressure therefrom.

The lever 29 is actuated by any suitable means by the operator, but as shown in Figure 1 it is treadle actuated, the rear end of this lever 29 being provided with a pivot screw 50 with which is engaged the upper end of a treadle rod 51. This treadle rod passes through a hole 52 in the table 53 on which the eyeletting machine is supported, and at its lower end is secured by the pivot 54 to the lever 55 fulcrumed at 56 on a bracket 57 secured to the lower face of the table 53. The rear end of the lever 55 is connected through the link 58 pivoted at opposite ends to the lever 55 and to a treadle 59, respectively. This treadle 59 is fulcrumed as at 60, on a floor block 61, and it may be provided with an adjustable abutment screw 62 to determine one limit of angular tilting motion by its impingement against the floor. It is normally held with its forward end downward as by a spring 63 and in this position of the parts the cam follower 28 is engaged by the upper and smaller diameter portion of the cam sleeve 16, in which position the gauge face 5 is in its closest operative position to the eyeletting mechanism. By pressing backwardly on the treadle 59, however, so as to bring its rear end down with the abutment 62 toward the floor, the lever 55 is rocked in a direction to push the rod 51 upward, this bringing the cam follower 28 down and forcing the rear end of the arm 8 away from the machine frame against the action of the spring 25, and forcing the gauging edge 5 further away from the work. The stop 62 is adjusted to determine the limit of this motion of the treadle and cooperates with the stop screw 33, the stop screw 33 acting to ensure sufficient accuracy of stopping position of the gauge and the stop screw 62 being adjusted to allow for lost motion in the various parts of the connections to the lever 29.

In Figures 3 and 4 the positions of the shoe quarter with relation to the wear plate 70 in the work table 3, which acts as an anvil for the punch which punches the holes for the eyelets, and to the slot 71 where the eyelets are actually set, are illustrated. In Figure 3 the gauge is set for the eyelets toward the back of the quarter, the cam follower roll 28 then engaging the sleeve 16 near its upper end. As the work progresses through the machine, the eyelets being set step by step to the forward eyelet, the operator depresses the back portion of the treadle 59, forcing the cam follower 28 downwardly against the larger diameter portion of the sleeve 16 and retracting the gauge face 5 so that the foremost eyelet is set further in from the edge of the work. This foremost eyelet is indicated at *a* while those further back are indicated by *b*, and this change in the position of the edge gauge may be effected by the operator so quickly that it is quite unnecessary to stop the operation of the machine for this purpose.

From the foregoing description of certain embodiments of this invention, it should be evident to those skilled in the art that various changes and modifications might be made without departing from the spirit or scope of this invention as defined by the appended claims.

I claim:—

1. In combination, an edge gauge, an abutment, a cam element on said gauge, means yieldingly holding said cam element against said abutment, and means actuable to move said abutment from one to another position with respect to said cam element, said cam element having a cam face for engagement with said abutment shaped to cause said abutment movement to move said gauge from one to another operating position.

2. In combination, an edge gauge, an abutment, a cam element on said gauge, means yieldingly holding said cam element against said abutment, means actuable to move said abutment from one to another position with respect to said cam element, said cam element having a cam face for engagement with said abutment shaped to cause said abutment movement to move said gauge from one to another operating position, and means for adjustably securing said cam element to said gauge.

3. In combination, a work table, an edge gauge having a part pivoted to said table, an arm extending from said pivot part, a cam sleeve eccentrically pivoted to said arm, means for locking said sleeve in any of a plurality of angular positions about its pivot, a lever having a cam follower portion bearing on said sleeve, and means actuable to rock said lever from one to another definite angular position, said sleeve having a cam face with which said follower cooperates shaped to cause such motion of said follower to rock said gauge about its pivot.

4. A movable gauge having a serrated locking member and a pivot element, a cam sleeve eccentrically journaled on said element and having parts cooperating with said locking member to hold said sleeve in any selected of a plurality of angular positions, yielding means releasably holding said sleeve and rocking member in locking engagement, a cam follower engaging said sleeve, and means actuable to move said follower along said sleeve, said sleeve having a cam surface for cooperation with said follower shaped to cause such movement of said follower to move said gauge.

5. A movable gauge having a serrated locking member and a pivot element, a cam sleeve eccentrically and slidably journaled on said element and having parts cooperating with said locking member to hold said sleeve in any selected of a plurality of angular positions, yielding means pressing said sleeve axially into engagement with said movable cam follower, and means holding said sleeve against said follower, said sleeve having a cam face shaped to cause movement of said follower to move said gauge.

6. In combination, an edge gauge, an abutment, a cam element operatively related to said gauge, means yieldingly holding said element against said abutment, means actuable to move said abutment from one to another position with respect to said gauge, said cam element having a cam face for engagement with said abutment shaped to cause said abutment movement to move said gauge from one to another operative position, and means supporting said cam for adjustment to bring selectively different portions of said cam face into position for engagement by said abutment.

7. In combination, an edge gauge, an abutment, a cam element operatively related to said gauge, means yieldingly holding said element against said abutment, means actuable to move said abutment from one to another position with respect to said gauge, said cam element having a cam face for engagement with said abutment shaped to cause said abutment movement to move said gauge from one to another operative position, and means supporting said cam for adjustment relative to said gauge to change the positions of said gauge controlled by said abutment.

MEDIO A. PATARSINI.